US012654782B2

(12) United States Patent
Ruttangusakul et al.

(10) Patent No.: US 12,654,782 B2
(45) Date of Patent: Jun. 16, 2026

(54) MODULAR CANOPY ASSEMBLY FOR PICK-UP TRUCKS

(71) Applicant: TOPUP TRUCK COVER CO., LTD., Phathumthani (TH)

(72) Inventors: Peerakiat Ruttangusakul, Bangkok (TH); Chidchanok Honglawan, Phathumthani (TH)

(73) Assignee: TOPUP TRUCK COVER CO., LTD., Phathumthani (TH)

( * ) Notice: Subject to any disclaimer, the term of this patent is extended or adjusted under 35 U.S.C. 154(b) by 403 days.

(21) Appl. No.: 18/269,483

(22) PCT Filed: Aug. 10, 2022

(86) PCT No.: PCT/TH2022/050003
§ 371 (c)(1),
(2) Date: Jun. 23, 2023

(87) PCT Pub. No.: WO2024/035349
PCT Pub. Date: Feb. 15, 2024

(65) Prior Publication Data
US 2024/0417004 A1 Dec. 19, 2024

(51) Int. Cl.
*B62D 33/04* (2006.01)
*B60J 1/18* (2006.01)
(Continued)

(52) U.S. Cl.
CPC ............ *B62D 33/04* (2013.01); *B60J 1/1876* (2013.01); *B62D 29/008* (2013.01)

(58) Field of Classification Search
CPC ......... B62D 33/04; B62D 33/044; B60P 7/02; B60J 7/141; B60J 7/1907; B60J 7/1621; B60J 7/106; B60J 1/1876
See application file for complete search history.

(56) References Cited

U.S. PATENT DOCUMENTS

| | | | |
|---|---|---|---|
| 7,988,218 B1 | 8/2011 | Devine |
| D930,551 S | 9/2021 | Suckling |

(Continued)

FOREIGN PATENT DOCUMENTS

| | | | | |
|---|---|---|---|---|
| EP | 3670222 A2 * | 6/2020 | ............ | B60J 7/1607 |
| WO | 2016042494 A1 | 3/2016 | | |

OTHER PUBLICATIONS

International search report PCT/TH2022/050003 dated Mar. 31, 2023 (pp. 1-3).

*Primary Examiner* — Daniel J Colilla
(74) *Attorney, Agent, or Firm* — Christopher B. Kilner; MILLEN, WHITE, ZELANO & BRANIGAN

(57) ABSTRACT

A modular canopy assembly for pick-up trucks is disclosed. The canopy assembly comprises a roof panel attached with a front and one or more side window panels via a front or one or more side window frames. Each window panel is attached to the roof panel by sealing an upper end of the window panel with the window frames and a lower end with a truck bed. The canopy assembly is affixed to the truck bed by canopy bed clamps using one or more fasteners. The canopy assembly further includes a rear door attached to the roof panel via a rear window frame. Each window panel slides and clips along the canopy assembly via the window frames and is assembled using a plurality of reinforced steel brackets downwards using one or more fasteners. The rear door further includes a gas strut for enabling easy opening and closing of the door.

15 Claims, 18 Drawing Sheets

(51) Int. Cl.
    *B60J 7/11*        (2006.01)
    *B62D 29/00*     (2006.01)

(56)             References Cited

U.S. PATENT DOCUMENTS

| | | | |
|---|---|---|---|
| 2014/0367990 | A1 | 12/2014 | Dost et al. |
| 2021/0129643 | A1* | 5/2021 | Voss ......................... B60J 7/141 |
| 2023/0373570 | A1* | 11/2023 | Facchinello ............. B60J 7/106 |
| 2024/0208308 | A1* | 6/2024 | Giner ...................... B60J 7/106 |
| 2025/0135853 | A1* | 5/2025 | Dylewski, II ............. B60R 9/02 |

\* cited by examiner

MODULAR CANOPY ASSEMBLY FOR PICK-UP TRUCKS

TECHNICAL FIELD

The present invention generally relates to pick-up trucks. More specifically, the present invention relates to a canopy or roof assembly having an aluminum profile assembly structure and one or more aluminum composite panels for covering a truck bed of a pick-up truck.

BACKGROUND

A Canopy is an overhead roof structure that provides shelter or covers a space. The canopies are most often used as small housing in pick-up trucks to cover the beds and to provide shelter to the vehicle operators. The housing is usually made of fiberglass, aluminum, plastic, etc. The housing includes an essential structure comprising a roof and other supports mounted atop the pick-up truck's rear bed. Further, the truck canopies improve space and keep things out of whether. There are so many canopies available in the market that is collapsible and easy to fit.

Existing canopies are complete structure canopy that consumes space for transportation. Also, the canopies require painting on the surface which gets damaged while assembling the canopy. Further, the existing canopies are complete shell unit canopy, made of fiber glasses, steel, aluminum, plastic, etc.

Therefore, there is a need for a canopy assembly for a pick-up truck configured to reduce transportation space. Further, there is a need for a canopy assembly having an aluminum profile and aluminum composite without the need for any painting process on their surfaces.

SUMMARY

The present invention generally discloses a canopy assembly for pick-up trucks. More specifically, the present invention relates to a canopy assembly for pick-up trucks comprising an aluminum profile assembly structure and one or more aluminum composite panels for covering a truck bed of a pick-up truck.

According to the present invention, the canopy assembly or roof assembly is attached to a bed of a pick-up truck. In one embodiment, the canopy assembly is an innovative and intelligent solution that has been designed to attach to a bed or cargo area of a pick-up truck. In one embodiment, the canopy assembly comprises a plurality of window panels and frames assembly to form the canopy structure for covering the truck bed of the pick-up truck. In one embodiment, the window panels are made of aluminum composite. In one embodiment, the frames are made of aluminum extrudes. In one embodiment, canopy assembly is configured to avoid any painting process after the installation as aluminum composite is a finished paint product. In one embodiment, the canopy assembly reduces the transportation space largely.

In one embodiment, the canopy assembly comprises a roof panel configured to attach to one or more window panels. The one or more window panels include a front window panel and at least two side window panels. In one embodiment, the roof panel includes a front window frame and at least two side window frames for receiving the front window panel and the at least two side window panels respectively. In one embodiment, the front window panel is attached to the roof panel via the front window frame by hingedly connecting an upper end of the front window panel to the front window frame. In one embodiment, the front window panel is attached to a lower end of the at least two side window frames configured to attach to the truck bed. In one embodiment, the at least two side window panels are attached to the roof panel via the at least two side window frames by hingedly connecting an upper end of each side window panel with the at least two side window frames.

In one embodiment, the canopy assembly further comprises a rear door configured to attach to the roof panel via a rear window frame. In one embodiment, each side window panel includes a side panel plate and an inner side plate. In one embodiment, an upper end of the side panel plate is sealed with a side panel frame and a lower end of the side panel plate is sealed with a lower end of the side panel frame affixed to the truck bed. In one embodiment, the at least two side window panels are attached to a lower end of at least two side frames configured to attach to the truck bed. In one embodiment, the front window panel, rear window panel, and at least two side window panels are configured to slide and clip along the canopy assembly via the front window frame, rear window frame, and at least two side window frames respectively.

In one embodiment, the canopy assembly further includes an inner roof plate reinforcement and one or more inner side plate reinforcements at each side window panel. In one embodiment, the canopy assembly further includes a plurality of reinforced steel brackets. In one embodiment, the canopy assembly is assembled with the front and one or more side panels. In one embodiment, the one or more inner side plate reinforcements of the side window panels are fastened using reinforced steel brackets. The inner side panel reinforcements are fastened downwards with the plurality of reinforced steel brackets. In one embodiment, the reinforced steel brackets are fastened with the inner roof plate reinforcements and any of the inner side plate reinforcements using one or more fasteners. In one embodiment, the reinforced steel brackets are fastened between at least two consecutive inner side plate reinforcements.

The canopy assembly of the present invention avoids any painting process after the installation as aluminum composite is a finished paint product. Also, the assembly process does not damage the painting surface. In addition, the canopy assembly includes foam tape to seal the canopy with the bed of the pick-up truck and rubber seals to seal around plates and door openings.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF EXAMPLE EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Referring to FIGS. 1-5, a various perspective view of a modular canopy or a canopy assembly or a roof assembly 100 is illustrated. In one embodiment, the canopy assembly 100 is an innovative and intelligent solution that has been designed to attach to a bed or cargo area of a pick-up truck. In one embodiment, the canopy assembly 100 comprises a plurality of window panels and frames assembly to form the canopy structure for covering the truck bed of the pick-up truck. In one embodiment, the window panels are made of aluminum composite. In one embodiment, the frames are made of aluminum extrudes. In one embodiment, canopy assembly 100 is configured to avoid any painting process after the installation as aluminum composite is a finished paint product. In one embodiment, the canopy assembly 100 reduces the transportation space largely.

Figure 1:
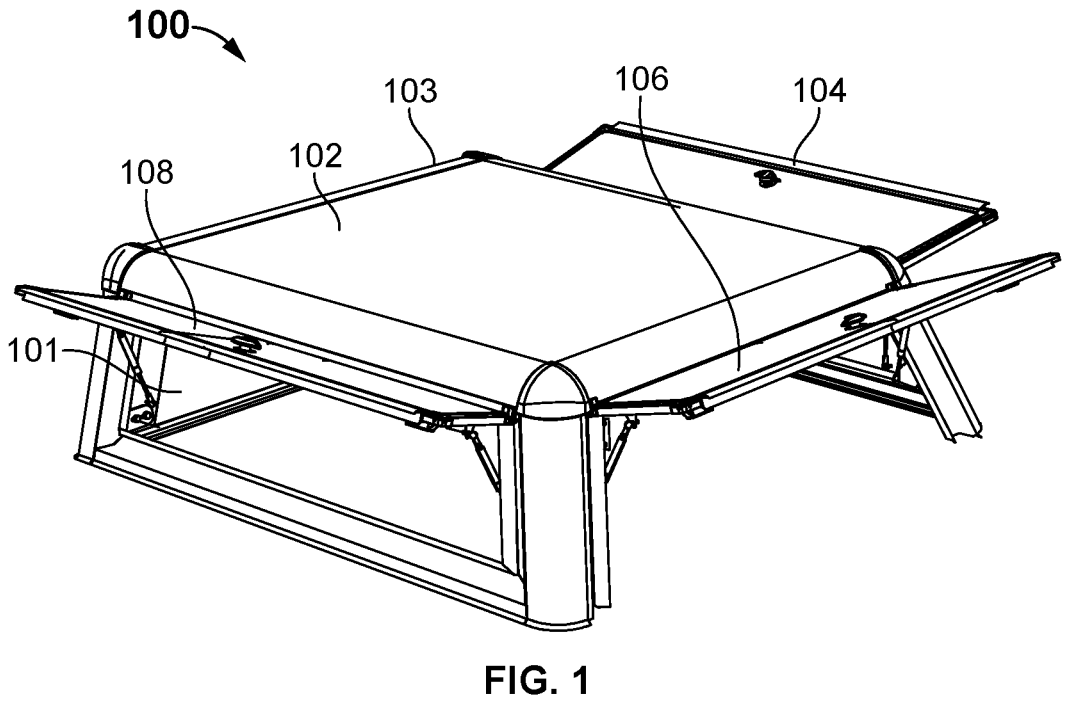
FIG. 1 shows a perspective view of a canopy assembly or roof assembly in an embodiment of the present invention.
Figure 2:
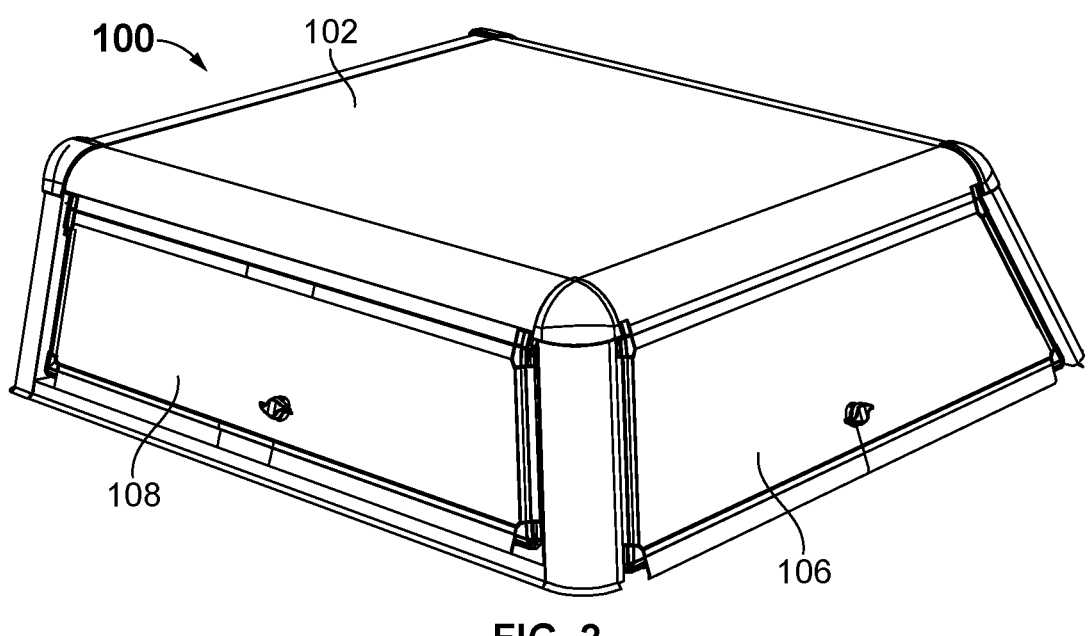
FIGS. 2-5 show various perspective views of the canopy assembly in one embodiment of the present invention.
Figure 3:
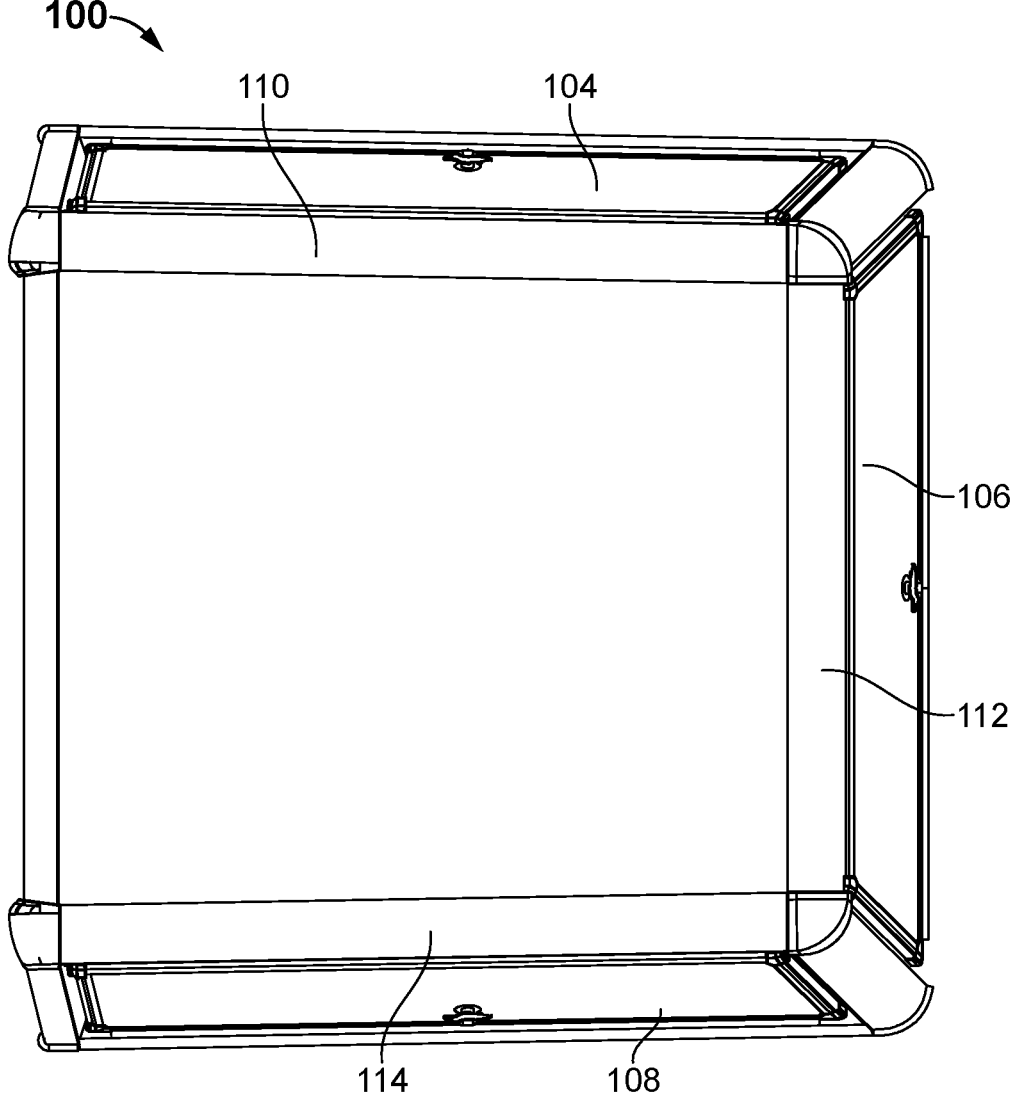
Figure 4:
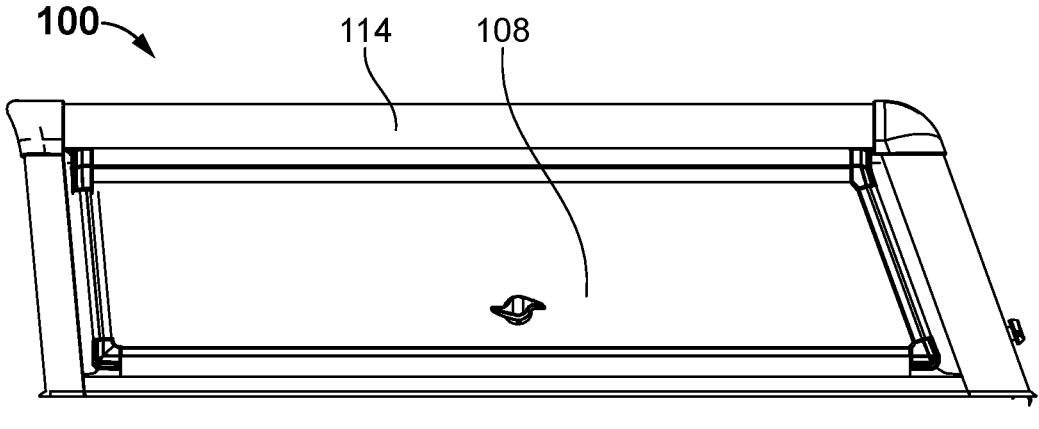
Figure 5:
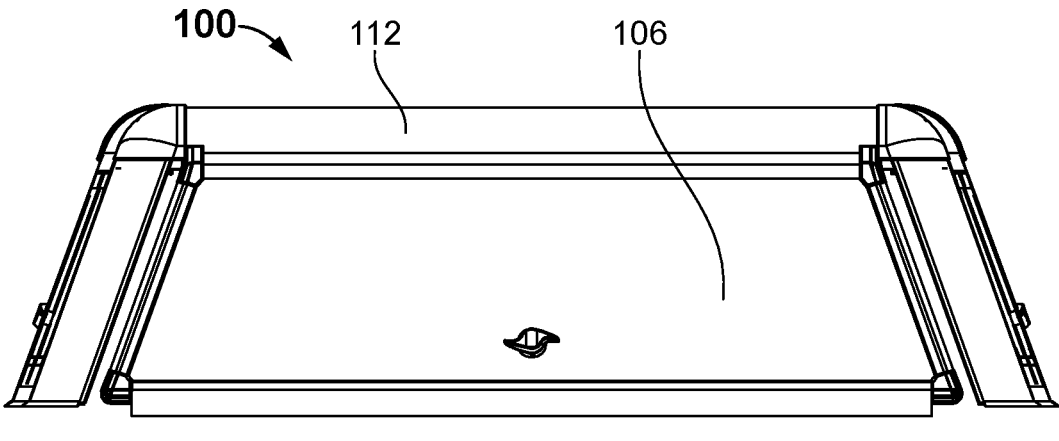
Figure 14:
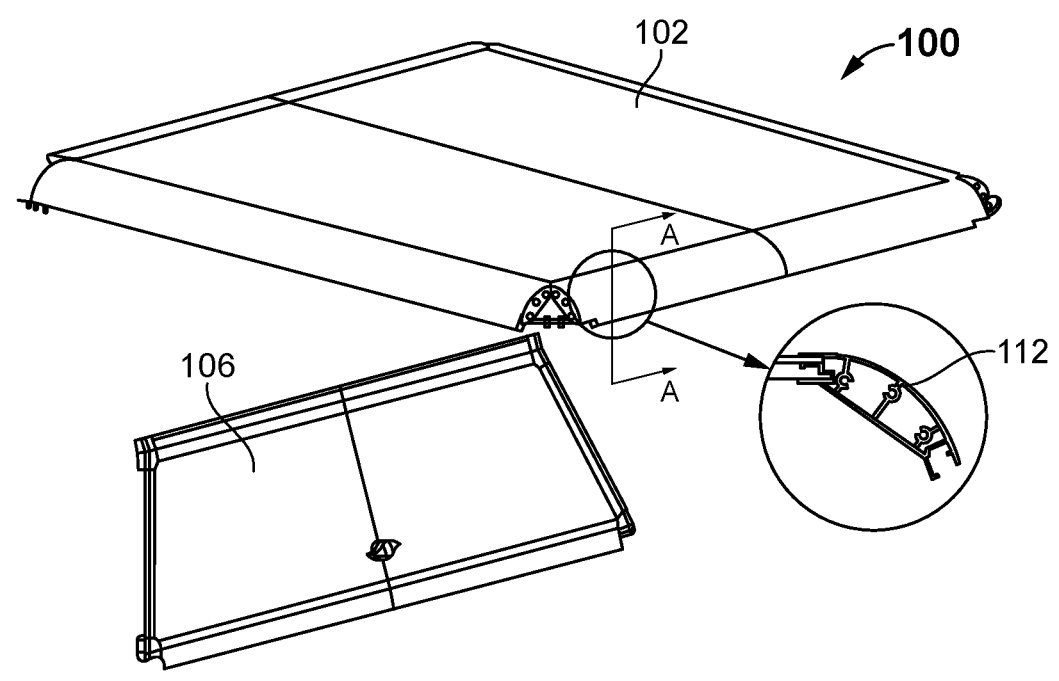
FIGS. 14-15 show various perspective views of the roof panel attached to the rear door in one embodiment of the present invention.
Figure 16:
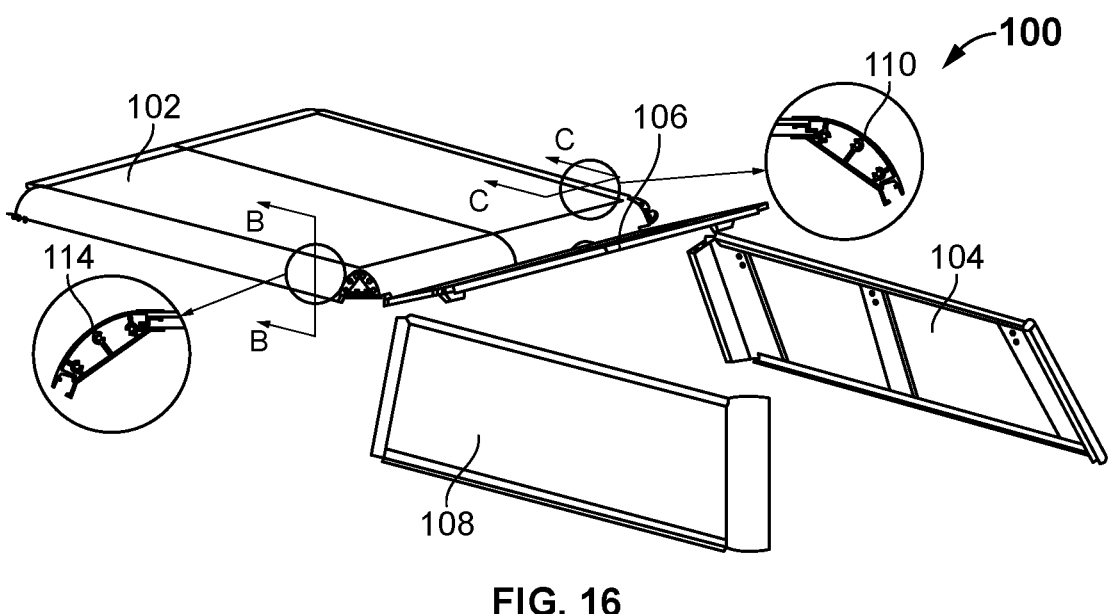
FIGS. 16-17 shows various perspective views of the roof panel attached with one or more window panels in one embodiment of the present invention.

In one embodiment, the canopy assembly 100 comprises a roof panel 102 attached with one or more window panels. In one embodiment, the window panels include a front window panel 101 and at least two side window panels (104 and 108) (as shown in FIGS. 1 and 2). In one embodiment, the roof panel 102 comprises one or more window frames for receiving the front window panel 101 and the side window panels (104 and 108) (as shown in FIG. 3). In one embodiment, the one or more window frames include a front window frame 103 and at least two side window frames (110 and 114). In one embodiment, the side window panels (104 and 108) are attached to the side window frames (110 and 114) as shown in FIG. 4 and FIG. 16. In one embodiment, the roof panel 102 further comprises a rear door 106. The rear door 106 is attached to the roof panel 102 via a rear window frame 112 as shown in FIG. 5 and FIG. 14.

Figure 6:
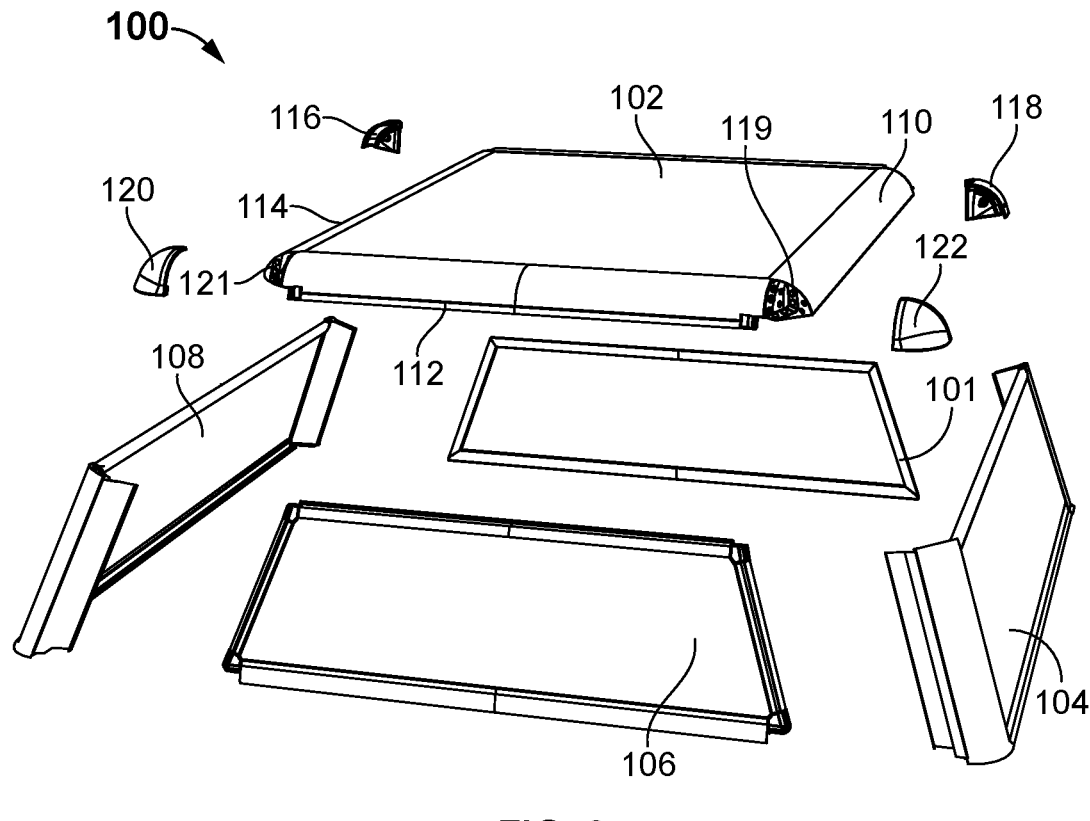
FIG. 6 shows an exploded view of the canopy assembly in one embodiment of the present invention.

Referring to FIG. 6, an exploded view of the canopy assembly 100 is illustrated. In one embodiment, the canopy assembly 100 comprises a roof panel 102 attached with one or more window panels. In one embodiment, the window panels include a front window panel 101 and at least two side window panels (104 and 108). In one embodiment, the roof panel 102 comprises one or more window frames for receiving the front window panel 101 and the side window panels (104 and 108). In one embodiment, the one or more window frames include a front window frame 103 and at least two side window frames (110 and 114). In one embodiment, the side window panels (104 and 108) are attached to the side window frames (110 and 114). In one embodiment, the roof panel 102 further comprises a rear door 106. The rear door 106 is attached to the roof panel 102 via a rear window frame 112. In one embodiment, the canopy assembly 100 further comprises one or more connecting brackets or connecting plates (119 and 121) to connect the front window frame 103, the rear window frame and the side window frames (110 and 114) covered by front covers (116 and 118) to a front end or front corners of the roof panel 102. In one embodiment, the canopy assembly 100 further comprises one or more rear covers (120 and 122) attached to a rear-end or rear corners of the roof panel 102. In one embodiment, the canopy assembly 100 further comprises a plurality of rubber seals to seal the canopy assembly 100 with a truck bed 202 of a pick-up truck 200 and one or more tape forms to seal around plates and door openings.

Figure 7:
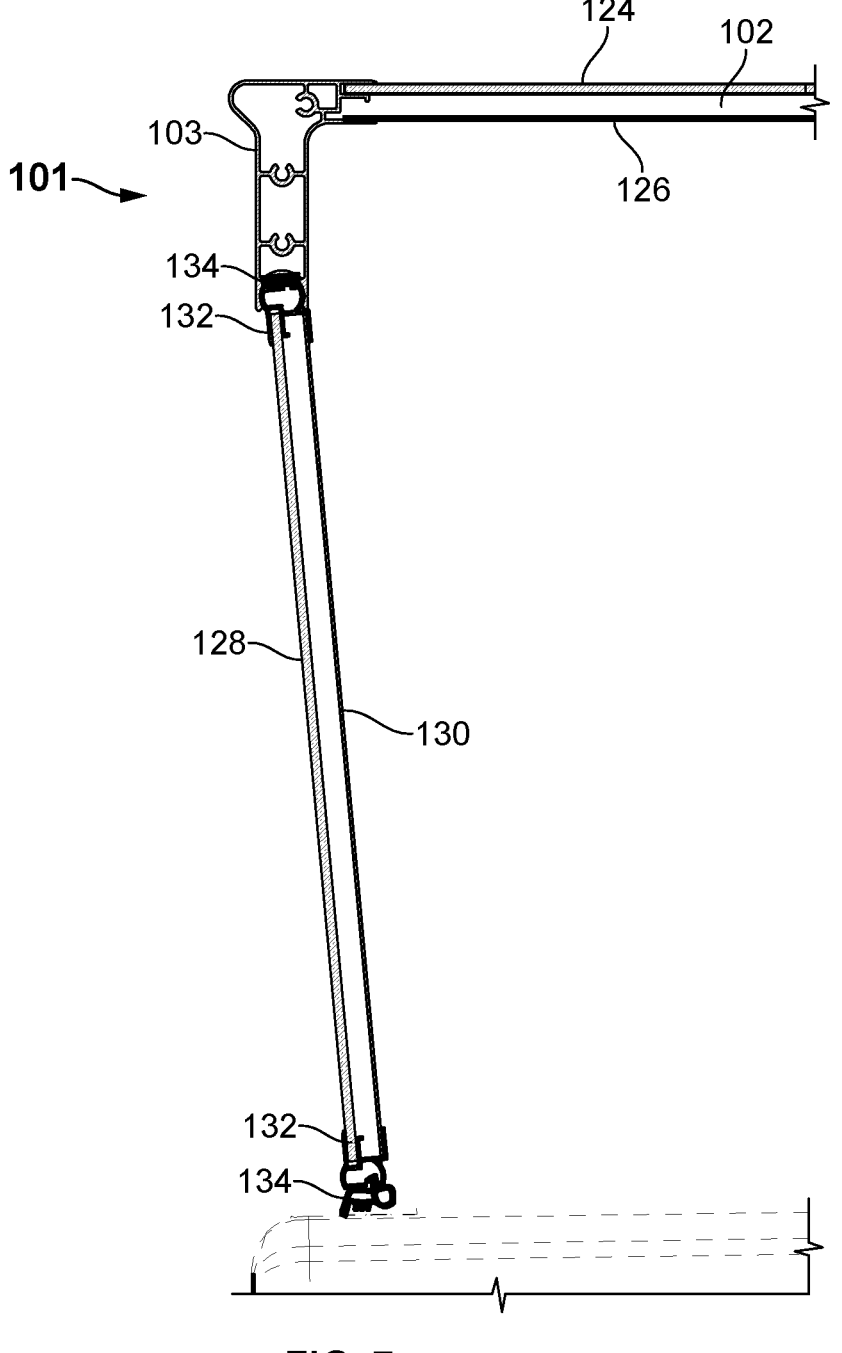
FIG. 7 shows a cross-sectional view of a front window panel attached to a roof panel in one embodiment of the present invention.

Referring to FIG. 7, a cross-sectional view of the front window panel 101 attached to the roof panel 102 via the front window frame 103 is illustrated. In one embodiment, the roof panel 102 includes a roof panel plate 124 at the top and an inner roof plate 126 at the bottom. In one embodiment, the roof panel plate 124 is attached to any one end of the front window frame 103. In one embodiment, the front window frame 103 holds the front window panel 101. In one embodiment, the front window panel 101 comprises a front panel plate 128 and an inner side plate 130. In one embodiment, the front window panel 101 is attached to a front panel frame 132 at the top and bottom ends of the front window panel 101. In one embodiment, the front window panel 101 attached with the front panel frame 132 is affixed to the roof panel 102 via the front window frame 103 using a front panel seal 134. In one embodiment, an upper end of the front window panel 101 is sealed to the front window frame 103 using the front panel seal 134. In one embodiment, a lower end of the front window panel 101 is attached to a lower end of the front panel frame 132 that is affixed to the truck bed 202.

Figure 8:
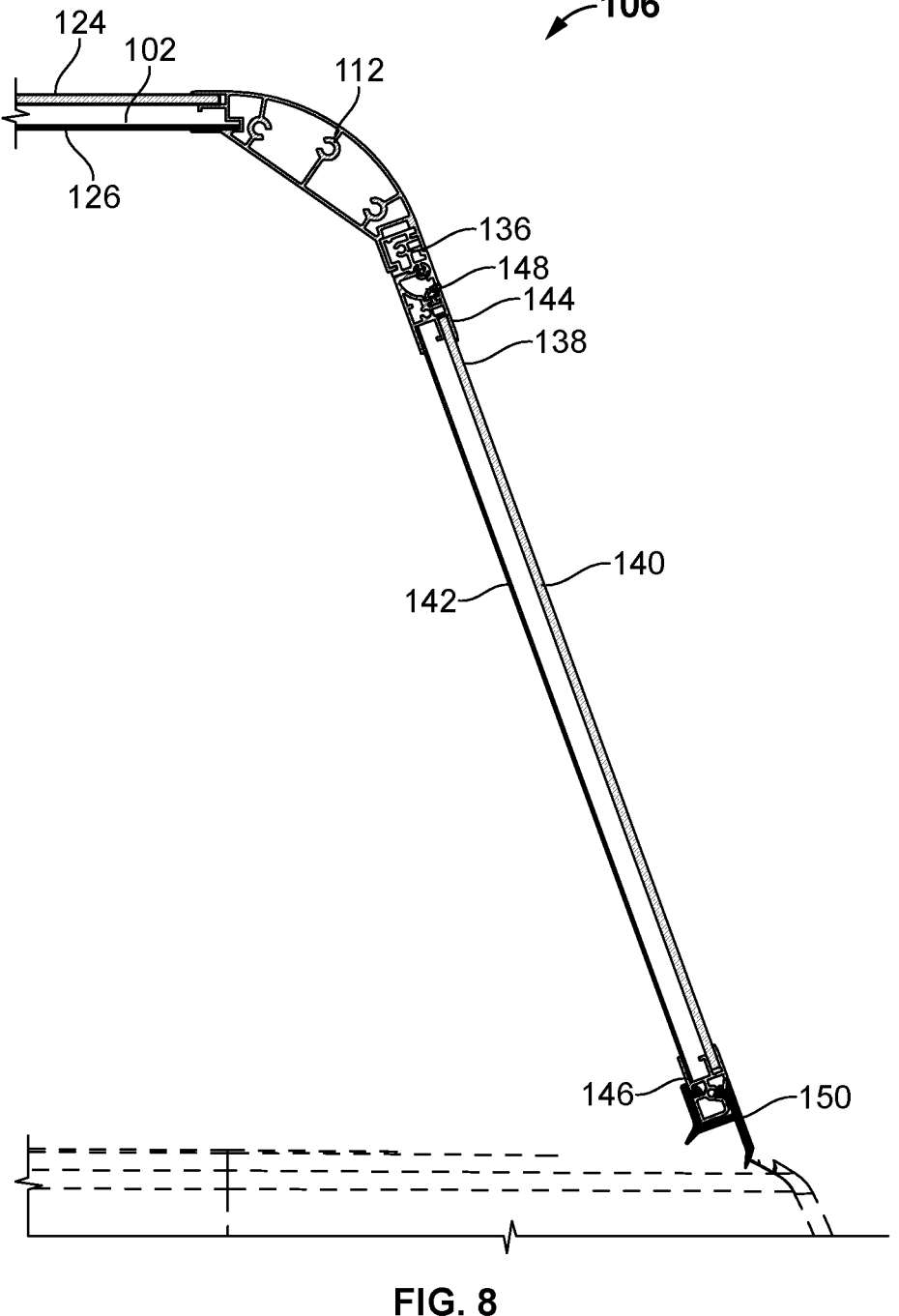
FIG. 8 shows a cross-sectional view of a rear door attached to a roof panel in one embodiment of the present invention.

Referring to FIG. 8, a cross-sectional view of the rear door 106 attached to the roof panel 102 via the rear window frame 112 is illustrated. In one embodiment, the roof panel 102 includes the roof panel plate 124 at the top and the inner roof plate 126 at the bottom. In one embodiment, the roof panel plate 124 is attached to any one end of the rear window frame 112. In one embodiment, the rear window frame 112 holds the rear door 106. In one embodiment, the rear door 106 is attached to the rear window frame 112 via a rear door hinge 136. In one embodiment, the rear door 106 includes a rear door plate 138 having a rear panel plate 140 and an inner rear plate 142. The rear door plate 138 has a top end and a bottom end. In one embodiment, the top end of the rear door plate 138 is attached to a rear door frame 144 and the bottom end is attached to a roof window frame 146. In one embodiment, the rear door 106 attached to the rear door frame 144 is affixed to the roof panel 102 via the rear window frame 112 using a seal 148. In one embodiment, an upper end of the rear door 106 is attached with the rear window frame 112 via the rear door hinge 136. In one embodiment, a lower end of the rear door 106 is attached with a lower end of the roof window frame 146. In one embodiment, the lower end of the rear door 106 is attached with the roof window frame 146 using a side frame seal 150.

Figure 9:
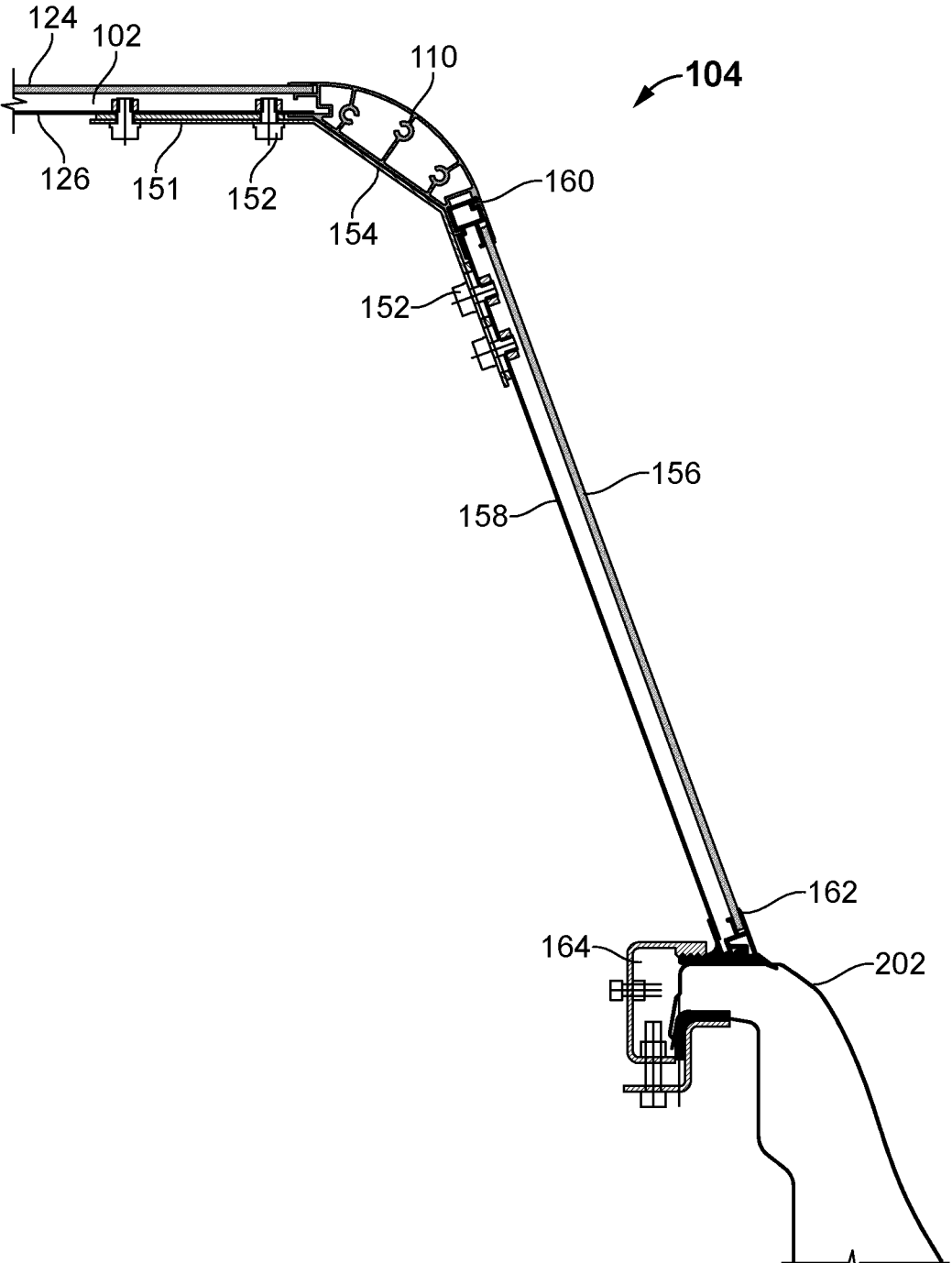
FIG. 9 shows a cross-sectional view of a fixed side window attached to the roof panel in one embodiment of the invention.

Referring to FIG. 9, a cross-sectional view of the side window panel 104 attached to the roof panel 102 via the side window frame 110 is illustrated. In one embodiment, the roof panel 102 includes the roof panel plate 124 at the top and the inner roof plate 126 at the bottom. In one embodiment, the roof panel plate 124 is attached to any one end of the side window frame 110. In one embodiment, the side window panel 104 further comprises one or more steel reinforcement brackets (151 and 154). In one embodiment, the steel reinforcement brackets (151 and 154) are attached to the roof panel using one or more fasteners 152. In one embodiment, the steel reinforcement brackets (151 and 154) may be one or more side panel brackets. In one embodiment, the fasteners 152 may be one or more bolts. In one embodiment, the side window frame 110 holds the side window panel 104. In one embodiment, the side window panel 104 includes a side panel plate 156 and an inner side plate 158. In one embodiment, both ends of the side window panel 104 is attached to a side panel frame 160. In one embodiment, the side window panel 104 attached with the side panel frame 160 is slidably attached to the roof panel 102 via the side window frame 110. In one embodiment, an upper end of the side window panel 104 is slidably attached with the side window frame 110. In one embodiment, a lower end of the side window panel 104 is attached with a lower end of the side window frame 110 that is affixed to the truck bed 202. In one embodiment, the lower end of the side window panel 104 is attached to the lower side of the side window frame 110 using a side seal 162. In one embodiment, a truck bed 202 is attached to a truck via a canopy bed clamp 164 using one or more fasteners.

Figure 10:
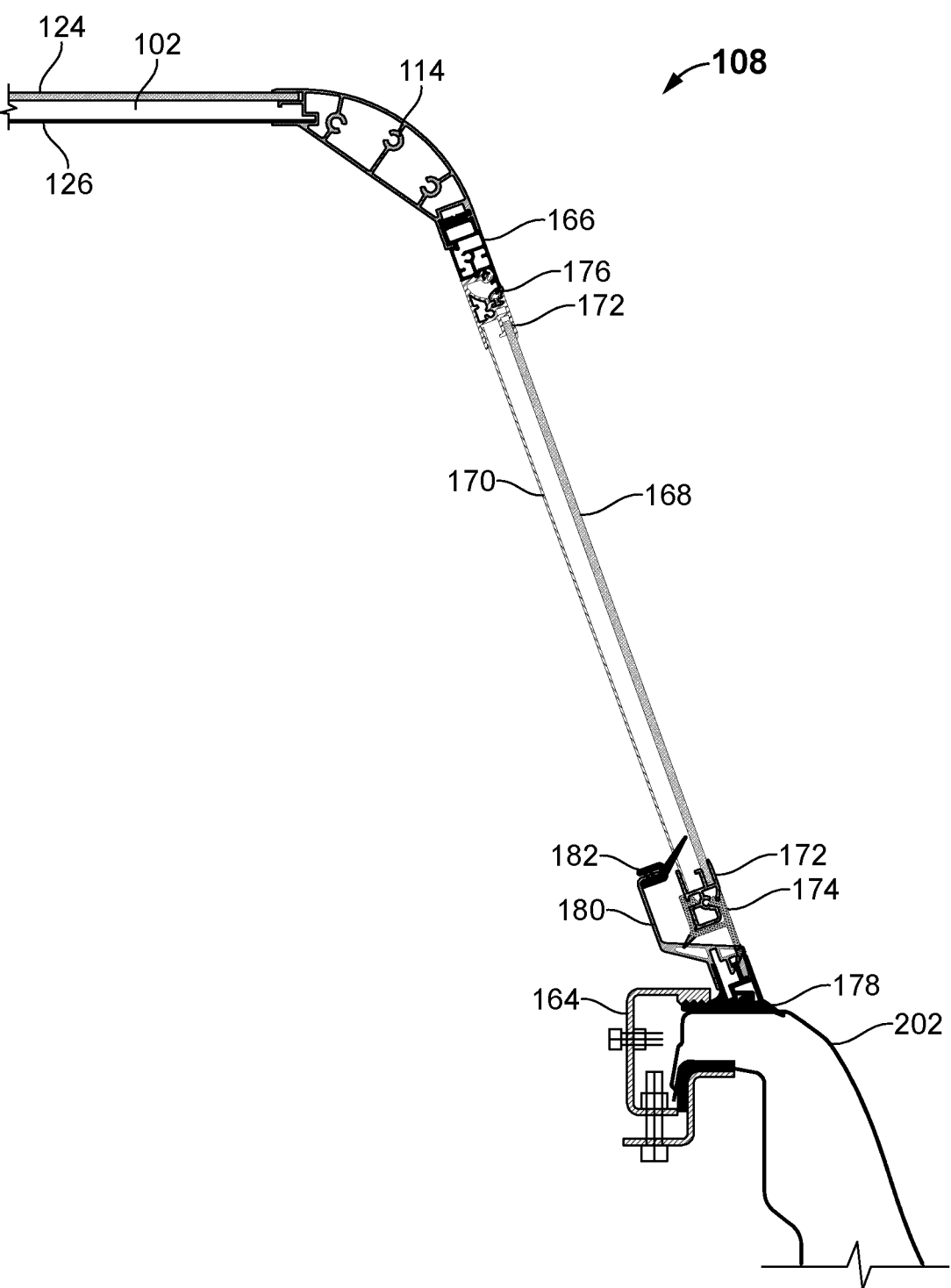
FIG. 10 shows a cross-sectional view of an open side window attached to the roof panel in one embodiment of the present invention.

Referring to FIG. 10, a cross-sectional view of the side window panel 108 attached to the roof panel 102 via the side window frame 114 is illustrated. In one embodiment, the roof panel 102 includes the roof panel plate 124 at the top and the inner roof plate 126 at the bottom. In one embodiment, the roof panel plate 124 is attached to any one end of the side window frame 114. In one embodiment, the side window frame 114 holds the side window panel 108. In one embodiment, the side window panel 108 is attached to the side window frame 114 via a side window hinge 166. In one embodiment, the side window panel 108 includes a side panel plate 168 and an inner side plate 170. In one embodiment, the side window panel 108 is attached to a side window frame 172 at its top and bottom ends. In one embodiment, the side window panel 108 is attached to the lower side of the side window frame 172 using a side frame seal 174. In one embodiment, the side window panel 108 attached with the side window frame 172 is removably connected to the roof panel 102 via the side window frame 114 using a seal 176. In one embodiment, an upper end of the side window panel 108 is attached with the side window frame 114 via the side window hinge 166. In one embodiment, a lower end of the side window panel 108 is attached with a lower end of the side window frame 172 that is affixed to the truck bed 202. In one embodiment, a lower end of the side window panel 108 is attached with a lower end of the side window frame 172 using a side seal 178. In one embodiment, the canopy is attached to the truck bed 202 of a truck 200 (shown in FIG. 21) via the canopy bed clamp 164 using one or more fasteners. In one embodiment, the side window panel 108 further includes a water rail 180 with a water seal 182 at the bottom end of the side window panel 108.

Figure 11:
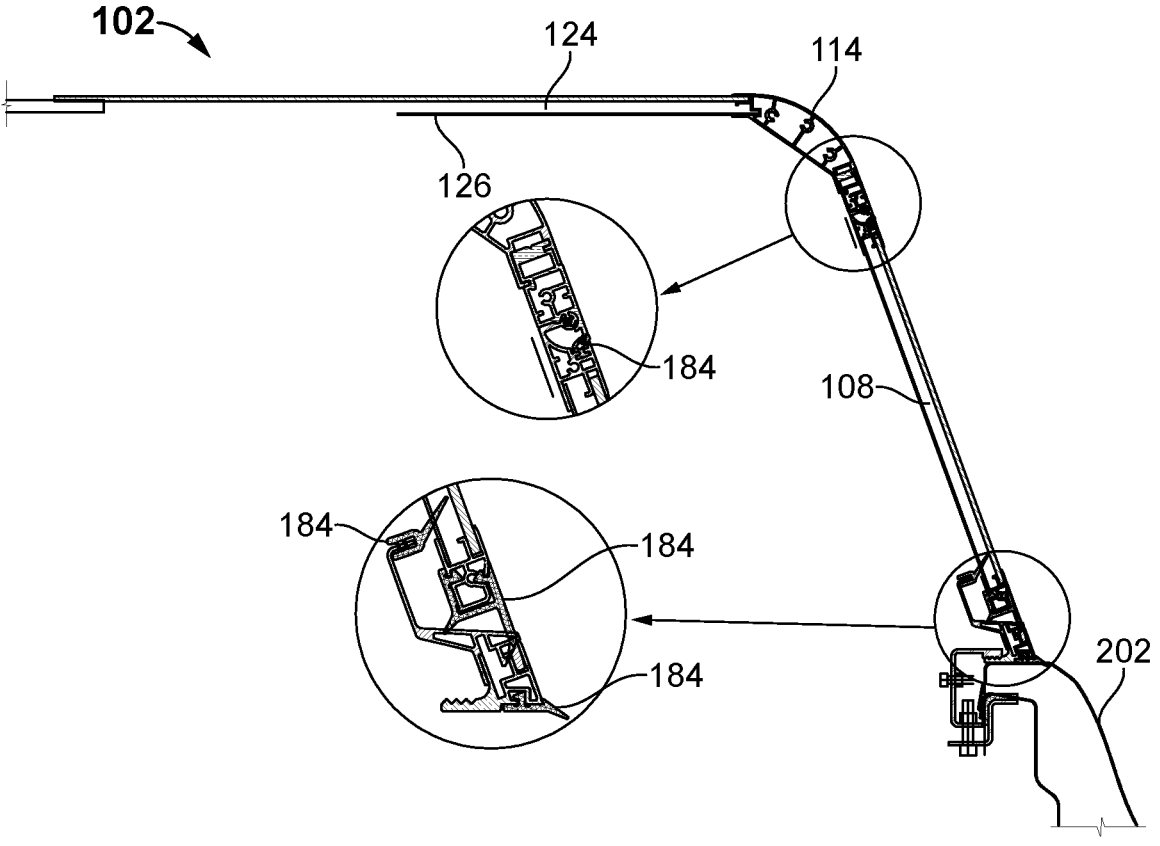
FIGS. 11-12 show various perspective views of the canopy assembly having a rubber seal in one embodiment of the present invention.
Figure 12:
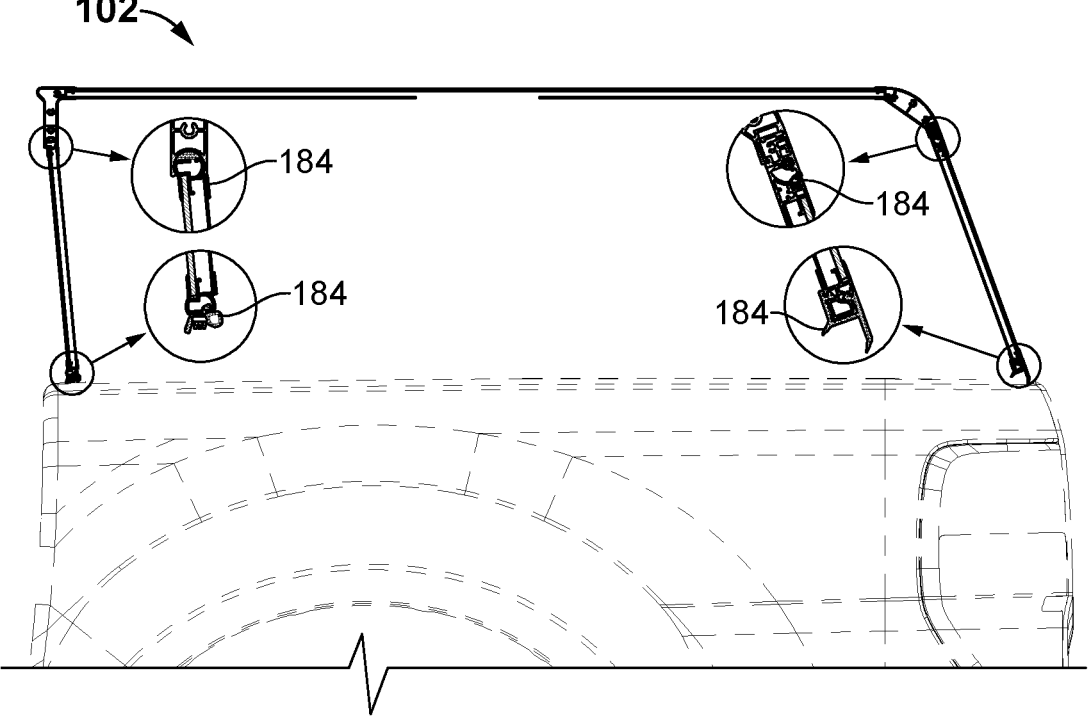

Referring to FIGS. 11-12, various perspective views of the roof panel 102 of the canopy assembly 100 with a rubber seal 184 is illustrated. In one embodiment, the side window panel 108 is attached to the roof panel 102 via a side window frame 114. In one embodiment, the side window panel 108 is affixed to the roof panel 102 by attaching the upper end of the side window panel 108 with the side window frame 114 via the side window hinge 166. In one embodiment, the rubber seal 184 is used to provide water-proof protection. In one embodiment, the side window panel 108 may include a plurality of rubber seals 184 for sealing the side window panel 108 with the side window frame 114 and for sealing or side sealing the side window panel 108 with the truck bed 202 (as shown in FIG. 11). In one embodiment, the rubber seal 184 is used to seal the window panels (101, 104, 106, and 108) at the upper and the lower ends of the roof panel 102 of the canopy assembly 100 (as shown in FIG. 12).

Figure 13:
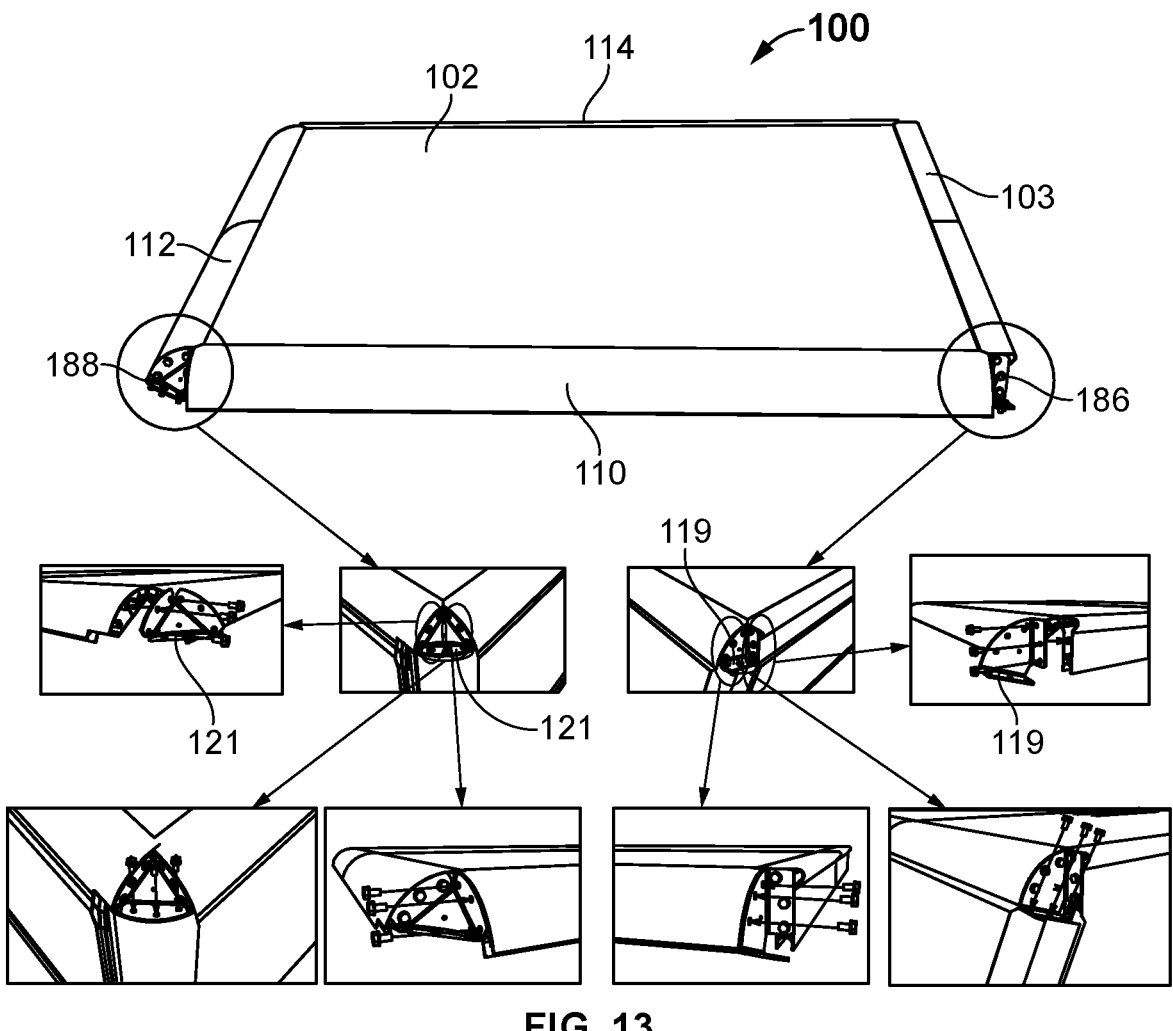
FIG. 13 shows a perspective view of the canopy assembly with one or more corners in one embodiment of the present invention.

Referring to FIG. 13, a perspective view of the canopy assembly 100 with one or more corners is illustrated. In one embodiment, the canopy assembly 100 comprises one or more window frames (103, 110, 112, and 114). In one embodiment, two consecutive window frames (103, 110, 112, and 114) together form a space with one or more corners at each end respectively. The front window frame 103 and one end of the side frames (110 or 114) form a front corner 186. The rear window frame 112 and another end of the side frames (110 or 114) form a rear corner 188. In one embodiment, the canopy assembly 100 further comprises one or more connecting brackets or connecting plates including a front connecting bracket 119 and a rear connecting bracket 121. In one embodiment, the connecting brackets (119 and 121) are used to connect the front roof frame 103, the rear roof frame 112, and the side roof frames (110 and 114), respectively.

In one embodiment, the front roof frame 103 and one end of the side roof frames (110 and 114) are connected to the front connecting bracket 119. The front frame 103 and one end of the side frames (110 and 114) are connected to the front connecting bracket 119 at the front corner 186 using one or more fasteners. In one embodiment, the rear roof frame 112 and another end of the side roof frames (110 and 114) are connected to the rear connecting bracket 121. The rear frame 112 and the another end of the side frames (110 and 114) are connected to the rear connecting bracket 121 at the rear corner 188 using one or more fasteners. Further, the front and rear corners (186 and 188) use a cover for closing the space between the consecutive frames (103, 110, 112, and 114).

Figure 15:
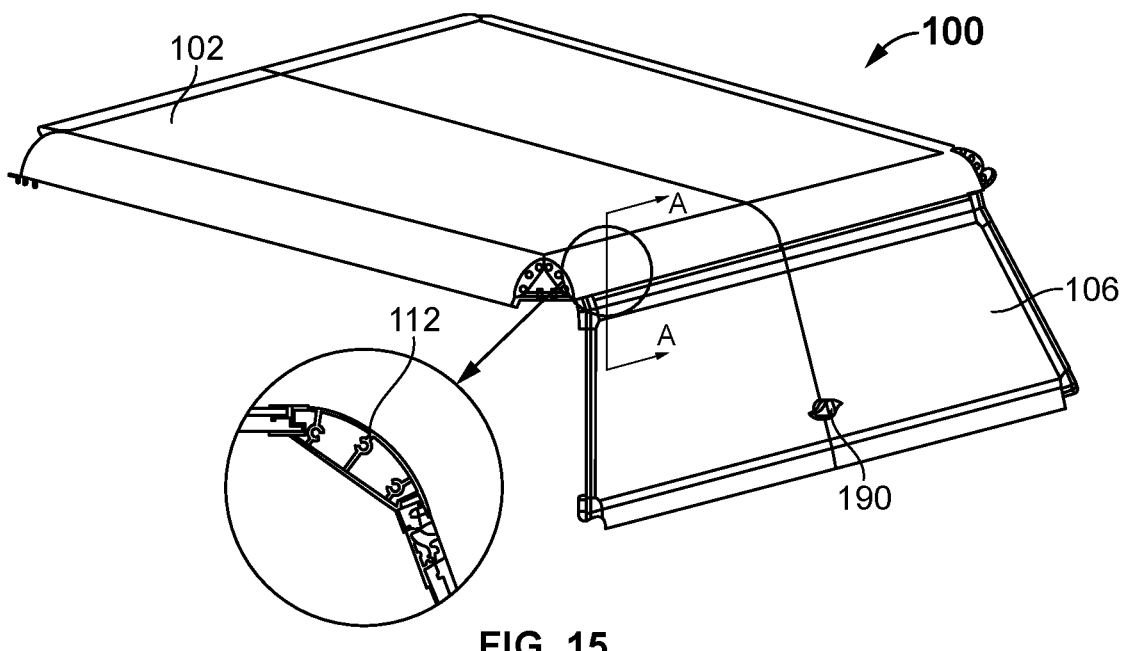
Figure 17:
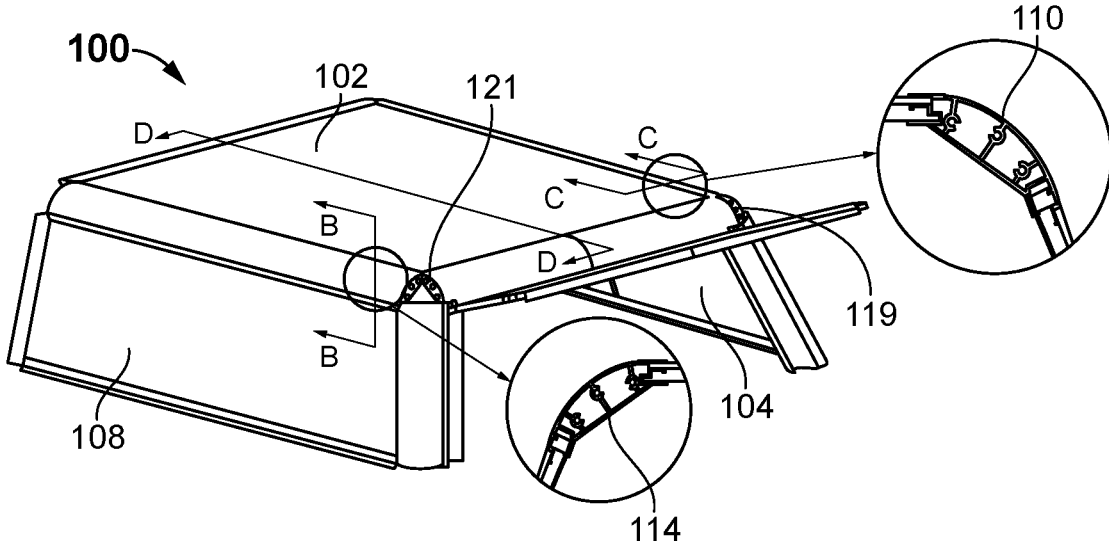
Figure 18:
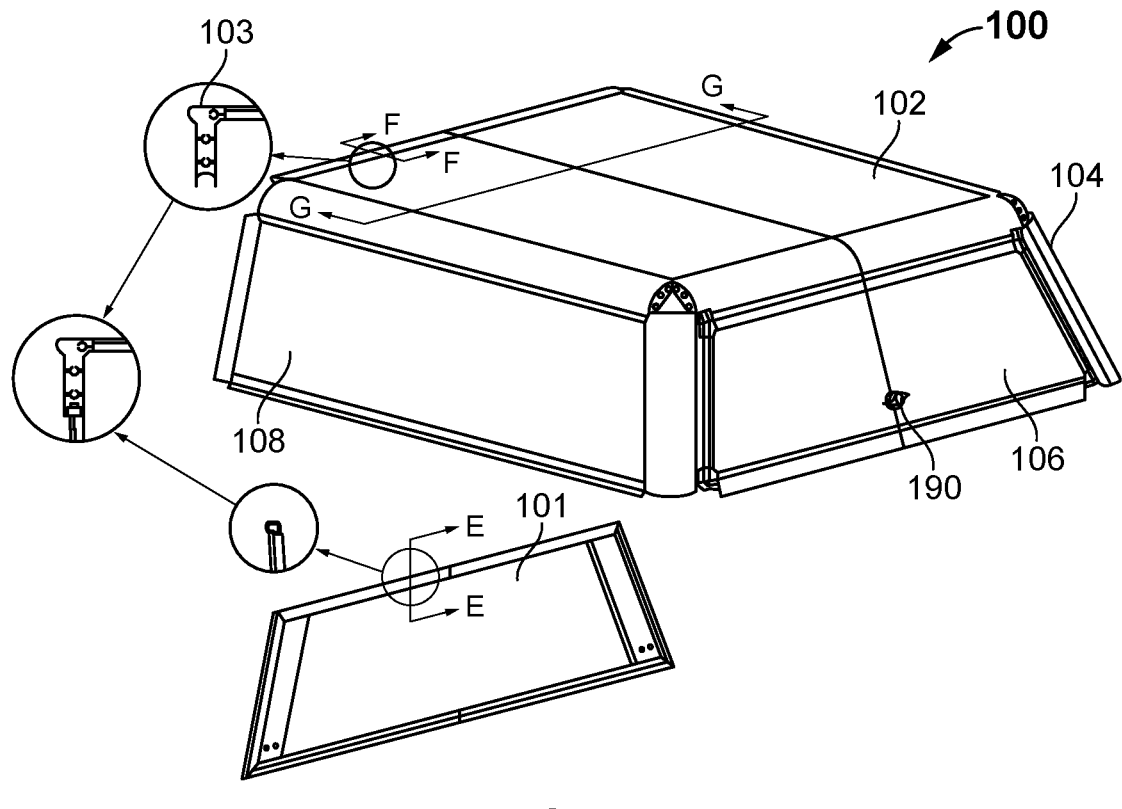
FIG. 18 shows a roof panel attached with the front window panel in one embodiment of the present invention.

Referring to FIGS. 14-18, various perspective views of the roof panel 102 attached with one or more window panels (104 and 108) are illustrated. In one embodiment, the rear door 106 is attached to the roof panel 102 by sliding the rear door 106 with the rear window frame 112 (as shown in FIG. 14). In one embodiment, the rear window frame 112 holds the rear door 106 (as shown in FIG. 15) using a rear door hinge 136 and one or more rubber sealing 184. In one embodiment, the rear door 106 includes a lock handle 190 to support the opening of the rear door 106. In one embodiment, the one or more side window panels (104 and 108) are attached to the roof panel 102 by siding and clipping the side window panels (104 and 108) with the side window frames (110 and 114) (as shown in FIG. 16). In one embodiment, the side window frames (110 and 114) hold the side window panels (104 and 108) (as shown in FIG. 17) using a side window hinge 166 and a rubber sealing 184. In one embodiment, the side window panels (104 and 108) are attached to the side window frames (110 and 114) using one or more connecting brackets (119 and 121). In one embodiment, the side window frames (110 and 114) slide and clip with the side window panels (104 and 108). In one embodiment, the front window panel 101 is attached to the roof panel 102 by pushing and clipping the front window panel 101 with the front window frames 103 (as shown in FIG. 18). In one embodiment, the front window frame 103 holds the front window panel 101 sliding and clipping the front window panel 101 with the front roof frame 103 at the top. Further, the front window panel 101 is attached with the truck bed 202 at the bottom by sealing.

Figure 19:
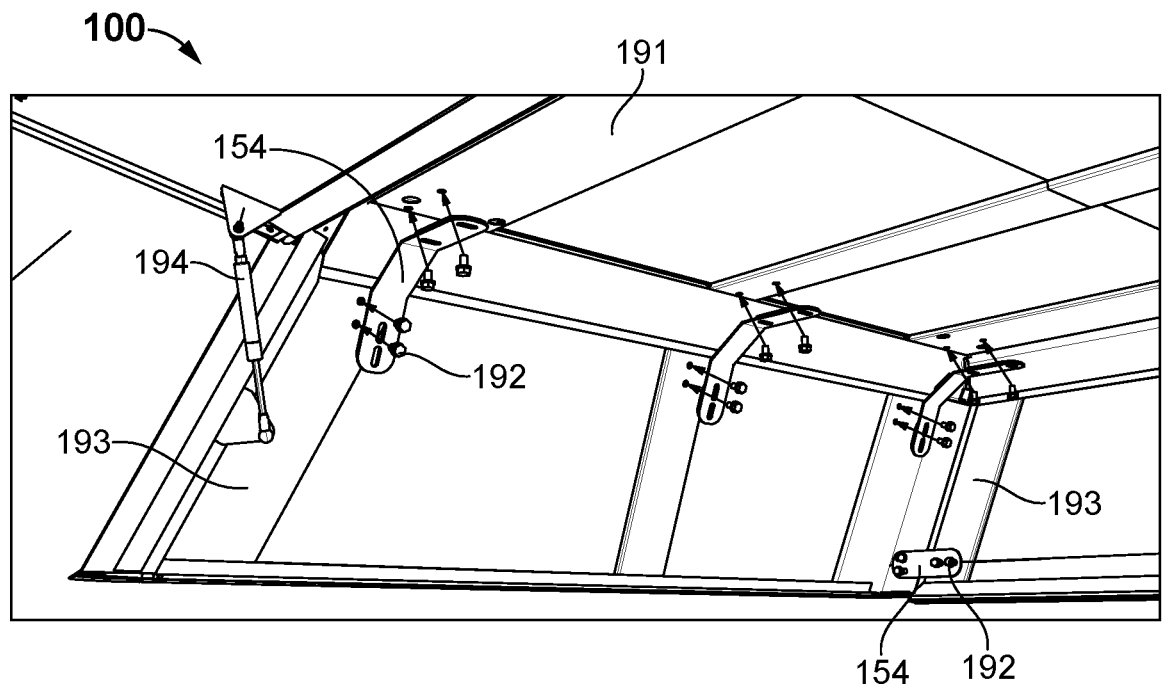
FIG. 19-22 show a plurality of reinforced steel brackets attached to the canopy assembly in one embodiment of the present invention.
Figure 20:
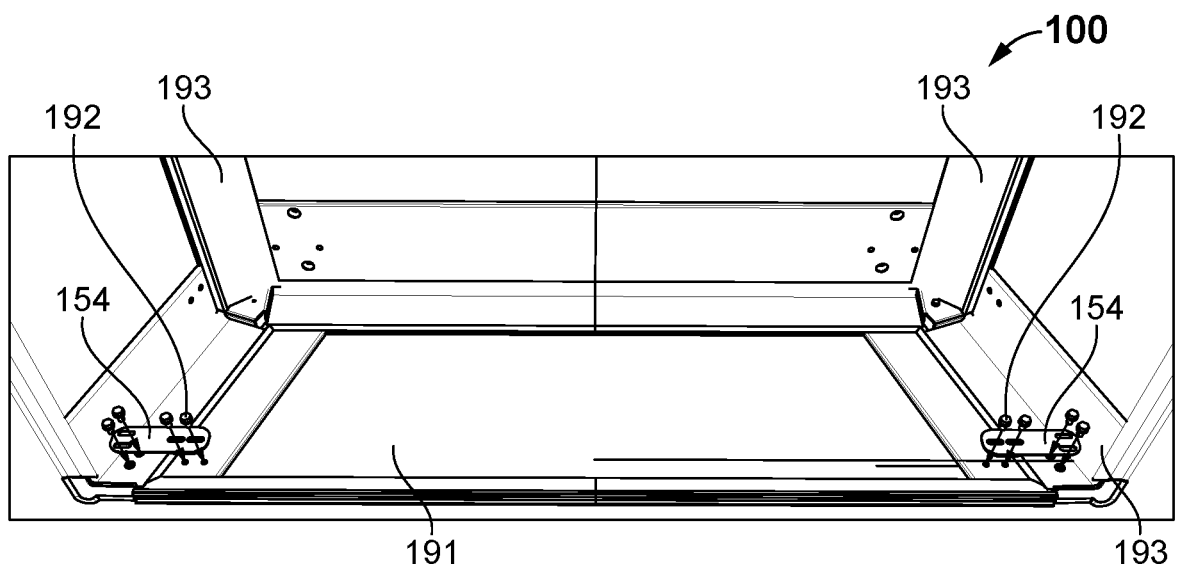
Figure 21:
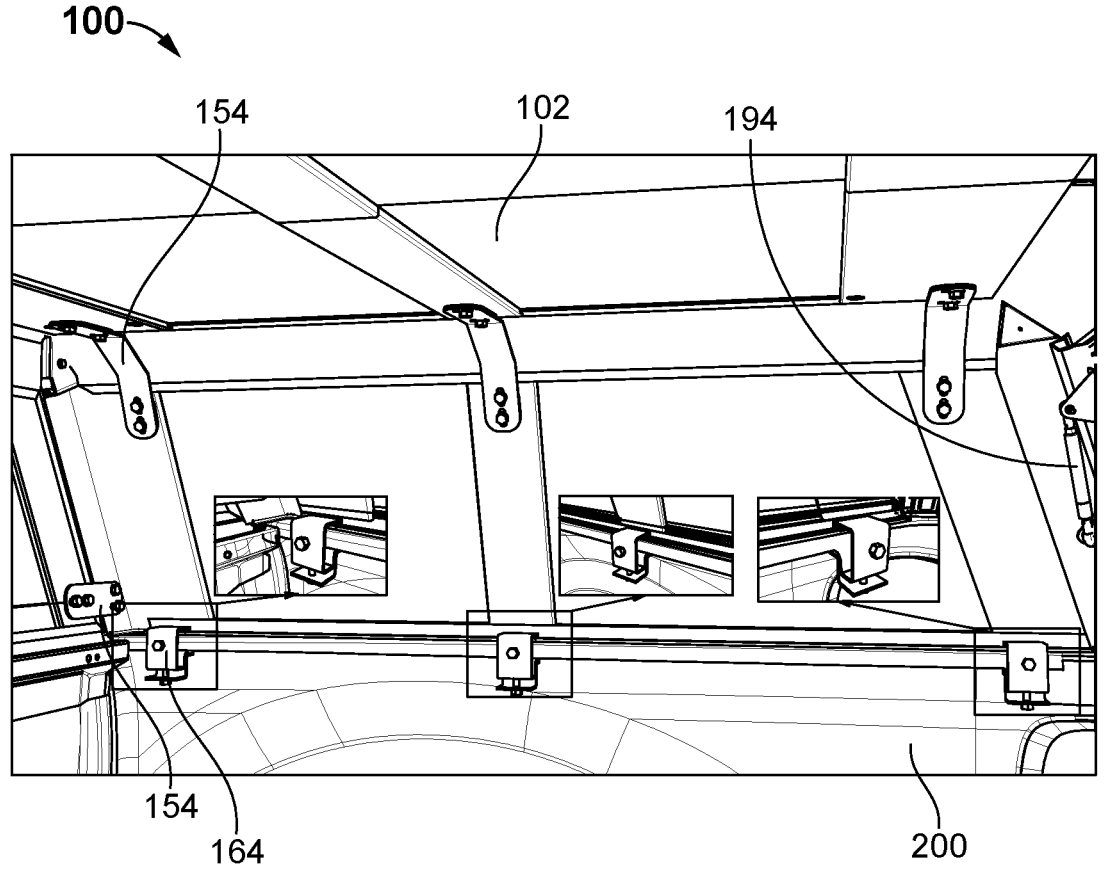
Figure 22:
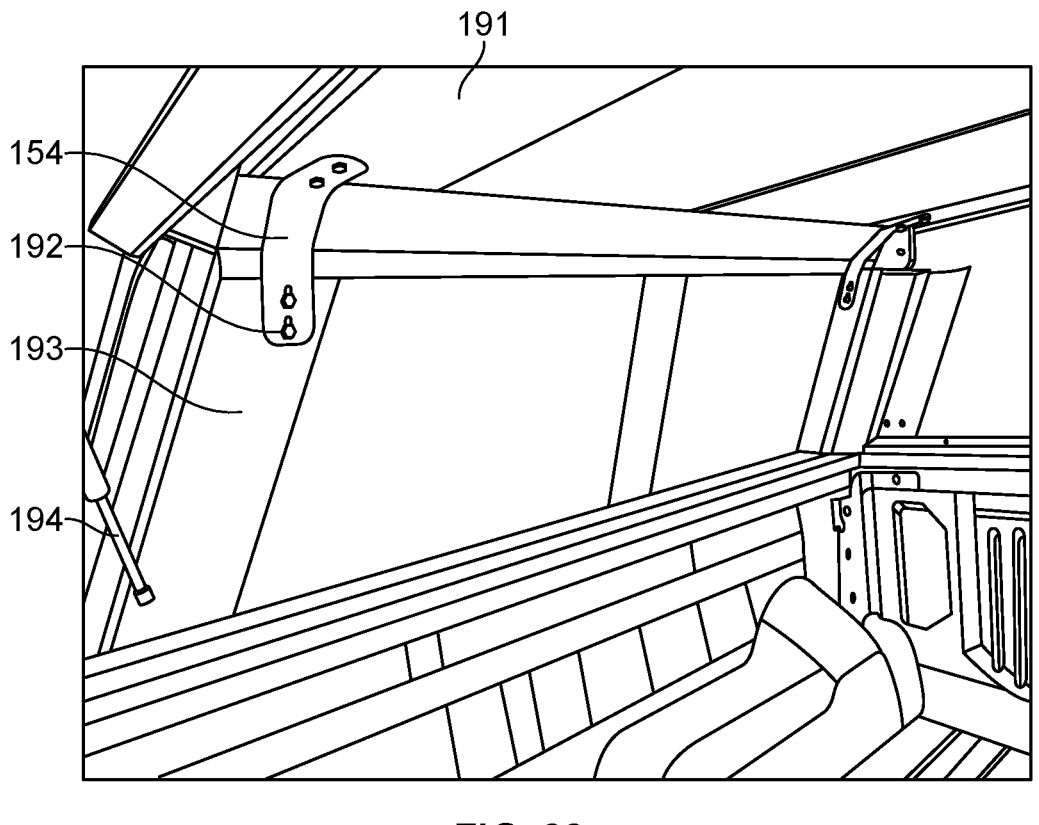
Figure 23:
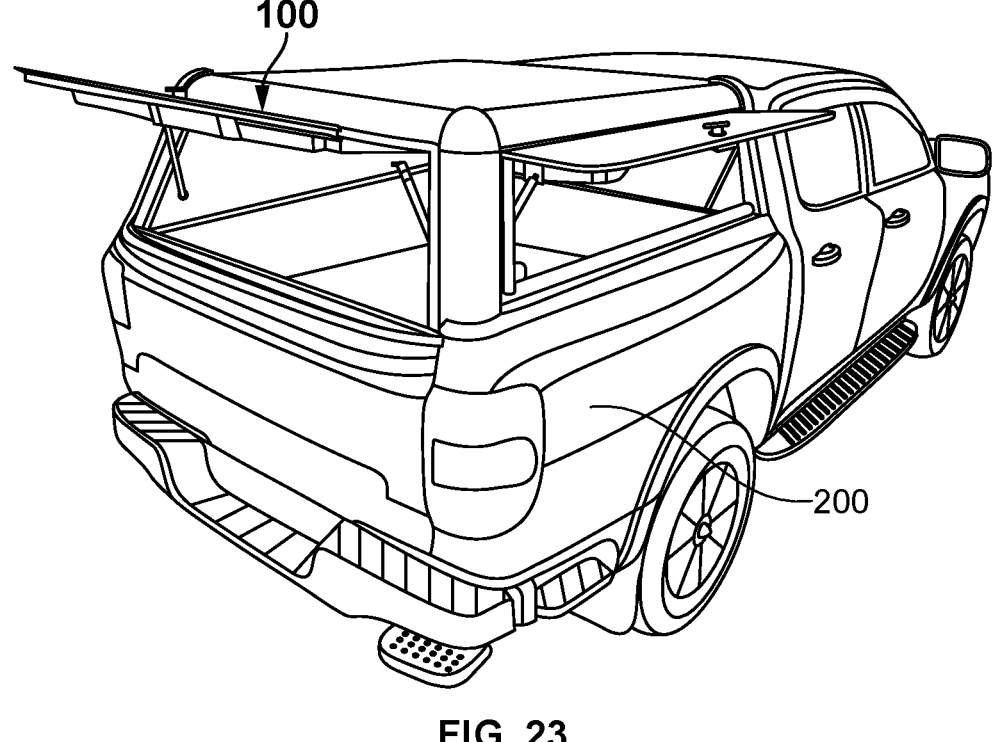
FIG. 23 show a canopy attached with a pick-up truck in one embodiment of the present invention.

Referring to FIGS. 19-23, a plurality of reinforced steel brackets 154 attached to the canopy assembly 100 are illustrated. In one embodiment, the canopy assembly 100 further includes an inner roof plate reinforcement 191 and one or more inner side plate reinforcements 193 at each side window panel (104, 106, and 108). In one embodiment, the canopy assembly 100 further includes a plurality of reinforced steel brackets 154. In one embodiment, the canopy assembly 100 is assembled with the front and one or more side panels (104, 106, and 108). In one embodiment, the one or more inner side plate reinforcements 193 of the side window panels (104, 106, and 108) are fastened using reinforced steel brackets 154. The inner side panel reinforcements 193 are fastened downwards with the plurality of reinforced steel brackets 154. In one embodiment, the reinforced steel brackets 154 are fastened with the inner roof plate reinforcements 191 and any of the inner side plate reinforcements 193 using one or more fasteners 192 (as shown in FIG. 20). In one embodiment, the reinforced steel brackets 154 are fastened between at least two consecutive inner side plate reinforcements 193 (as shown in FIG. 19). In one embodiment, the canopy assembly 100 further comprises a gas strut 194. In one embodiment, the gas strut 194 is attached to the window panels (104, 106, and 108) at one end and the inner roof plate reinforcement 191 at the other end for opening and closing the window panels or doors (as shown in FIGS. 19 and 22). The framed canopy assembly 100 is clamped to the truck bed 202 of the truck 200 using canopy bed clamp 164 at each end and in between (as shown in FIG. 21). In one embodiment, the canopy assembly 100 with plurality of window panels and frames are assembly to form the canopy structure for covering the truck bed 202 of the pick-up truck 200 (as shown in FIG. 23).

Advantageously, the canopy assembly of the present invention comprises a plurality of panels and frames assembled to form a canopy assembly for covering the truck bed of the pick-up trucks. The canopy assembly is a modular canopy that is made of aluminum extrudes for frames and aluminum composite for window panels. The canopy assembly of the present invention avoids any painting process after the installation as aluminum composite is a finished paint product. Also, the assembly process does not damage the painting surface. In addition, the canopy assembly includes rubber to seal the canopy with the bed of the pick-up truck and tape forms to seal around plates and door openings. Further, the canopy assembly reduces the transportation space largely. Further, a 400-foot boat container may contain about 80 to 90 canopy assemblies.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A canopy assembly for covering a truck bed of a pick-up truck, comprising:

a roof panel configured to attach to one or more window panels including a front window panel and at least two side window panels, wherein the roof panel includes a front window frame and at least two side window frames for receiving the front window panel and the at least two side window panels respectively;

wherein the front window panel is attached to the roof panel via the front window frame by hingedly connecting an upper end of the front window panel to the front window frame, wherein the at least two side window panels are attached to the roof panel via the at least two side window frames by hingedly connecting an upper end of each side window panel with the at least two side window frames, a rear door configured to attach to the roof panel via a rear window frame, wherein the rear door includes a rear door plate having a rear panel plate and inner rear plate,

wherein the rear door plate is attached to a rear door frame at its top end and a roof window frame at its bottom end, and wherein the front window panel, rear window panel, and at least two side window panels are configured to slide and clip along the canopy assembly via the front window frame, rear window frame, and at least two side window frames, respectively.

2. The canopy assembly of claim 1, wherein each side window panel includes a side panel plate and an inner side plate.

3. The canopy assembly of claim 1, wherein the front window panel is attached to a lower end of the at least two window frames configured to attach to the truck bed.

4. The canopy assembly of claim 1, wherein the at least two side window panels are attached to a lower end of at least two side frames configured to attach to the truck bed.

5. The canopy assembly of claim 1, wherein the at least two side window panels are attached to the at least two side window frames via a side window hinge.

6. The canopy assembly of claim 1, wherein the at least two side window panels further comprise a water rail and a window seal at the bottom of each side window panel.

7. The canopy assembly of claim 1, wherein the rear door is attached to the rear window frame via a rear door hinge.

8. The canopy assembly of claim 1, is affixed to the truck bed using one or more canopy bed clamps at each end.

9. The canopy assembly of claim 8, wherein the truck bed is attached to the one or more canopy bed clamps using one or more fasteners.

10. The canopy assembly of claim 1, further includes one or more front covers and one or more rear covers configured to close a space created on each a front corner and a rear corner.

11. The canopy assembly of claim 1, wherein the front window frame, the at least two side window frames, and the rear window frame are made of aluminum extrudes.

12. The canopy assembly of claim 1, wherein the front window panel and the at least two side window panels are made of aluminum composite.

13. The canopy assembly of claim 1, further comprises a plurality of rubber seals configured to attach the roof panel with the front window panel and the at least two side window panels.

14. The canopy assembly of claim 1, further comprises a gas strut attached to the roof panel configured to enable an opening and closing of the rear door.

15. The canopy assembly of claim 1, further comprises a foam tape configured to seal around one or more side plates and window panel openings.

* * * * *